(No Model.) 2 Sheets—Sheet 1.

E. H. SHAW.
APPARATUS FOR MANUFACTURING GASEOUS FUEL OR ILLUMINATING GAS.

No. 378,940. Patented Mar. 6, 1888.

Witnesses:
Walter E. Lombard.
Albert Leavitt.

Inventor:
Edwin H. Shaw,
by N. C. Lombard,
Attorney.

(No Model.) 2 Sheets—Sheet 2.

E. H. SHAW.
APPARATUS FOR MANUFACTURING GASEOUS FUEL OR ILLUMINATING GAS.

No. 378,940. Patented Mar. 6, 1888.

Witnesses:
Walter E. Lombard
Albert Leavitt

Inventor:
Edwin H. Shaw,
by N. C. Lombard Attorney.

UNITED STATES PATENT OFFICE.

EDWIN H. SHAW, OF BOSTON, ASSIGNOR OF NINE-TENTHS TO WILLIAM B. FRINK AND ANDREW W. HAYES, BOTH OF REVERE, MASSACHUSETTS.

APPARATUS FOR MANUFACTURING GASEOUS FUEL OR ILLUMINATING-GAS.

SPECIFICATION forming part of Letters Patent No. 378,940, dated March 6, 1888.

Application filed March 23, 1887. Serial No. 232,113. (No model.)

*To all whom it may concern:*

Be it known that I, EDWIN H. SHAW, of Boston, in the county of Suffolk and State of Massachusetts, have invented certain new and useful Improvements in Apparatus for Manufacturing Gaseous Fuel or Illuminating-Gas, of which the following, taken in connection with the accompanying drawings, is a specification.

My invention relates to apparatus for manufacturing gaseous fuel or illuminating-gas from petroleum, mineral fats, and other oils and steam; and it consists in certain novel features of construction, arrangement, and combination of parts, which will be readily understood by reference to the description of the drawings and to the claims to be hereinafter given.

Figure 1:
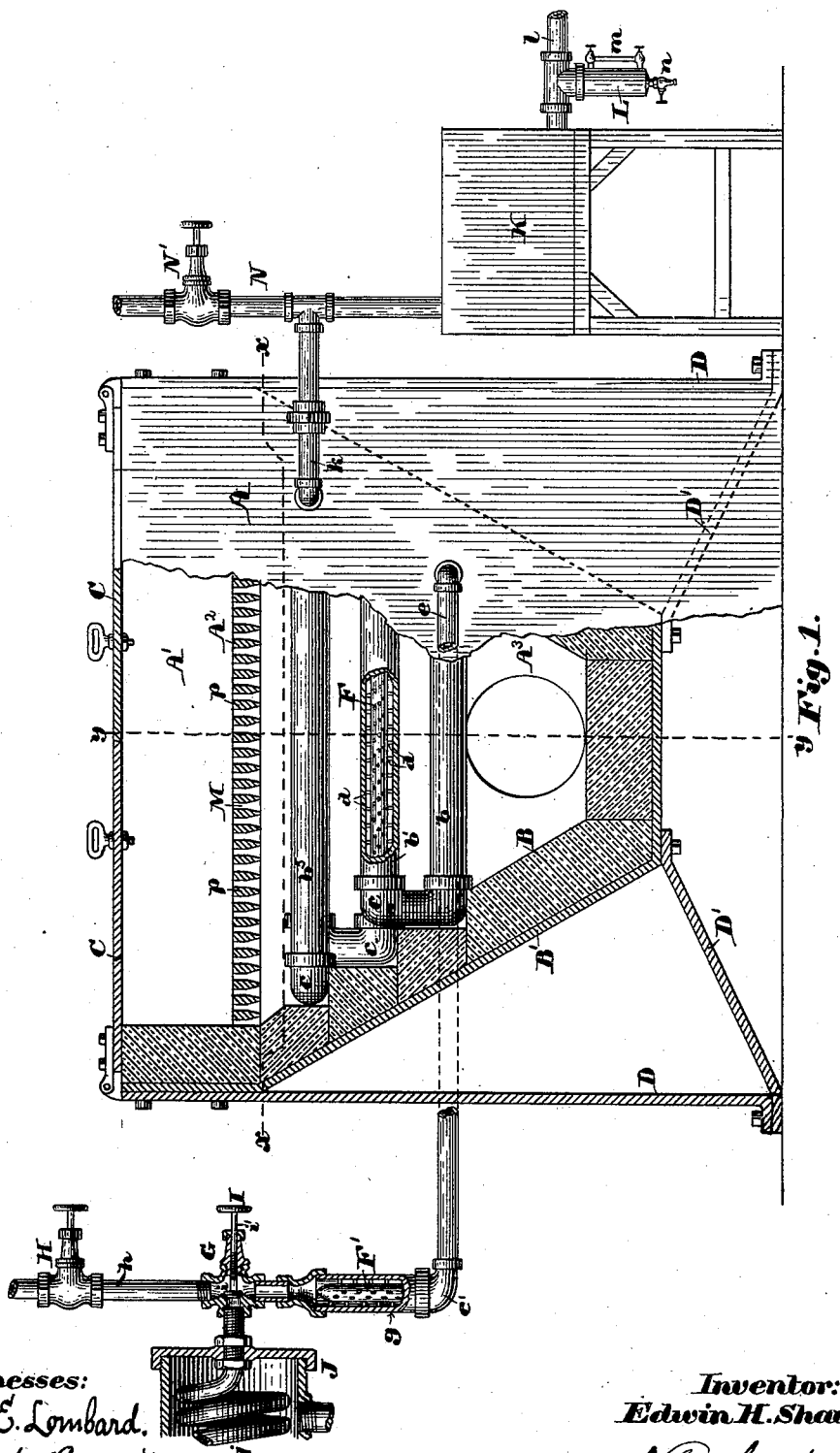
Figure 2:
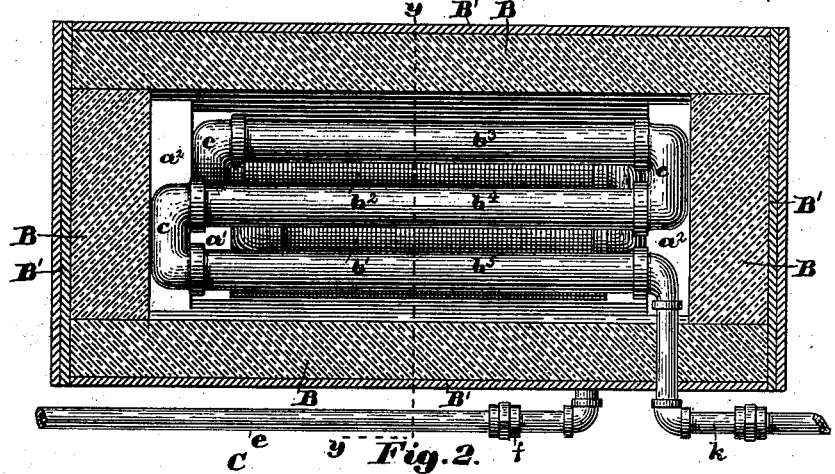
Figure 3:
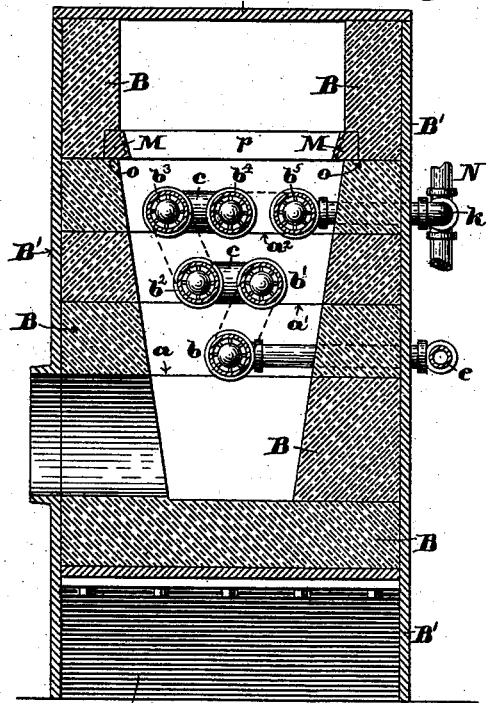
Figure 4:
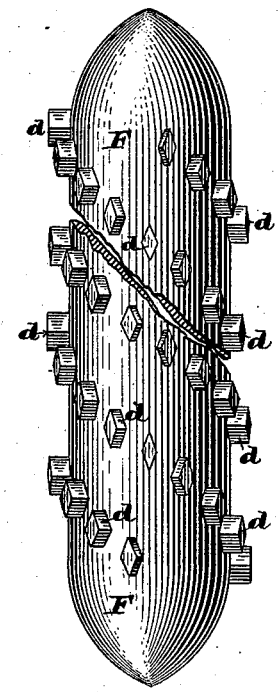
Figure 6:
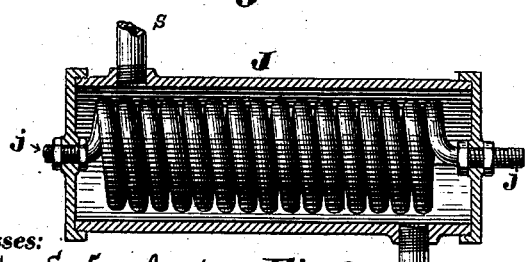
Figure 5:
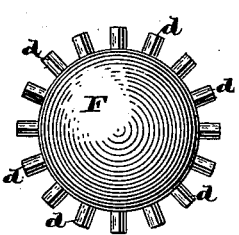

Figure 1 of the drawings is a sectional elevation of an apparatus embodying my invention. Fig. 2 is a horizontal section on line $x\,x$ on Fig. 1. Fig. 3 is a vertical section on line $y\,y$ on Figs. 1 and 2. Figs. 4 and 5 are respectively a plan and an end view of the current-breaker or atomizer; and Fig. 6 is a central longitudinal section of the oil-heating steam-chamber, with the spiral oil-pipe in elevation.

In the drawings, A is a furnace having a downdraft, in which A' is the fire-chamber; A², the grate; A³, the downdraft combustion-chamber, the walls of which are inclined inward, and are formed of fire-bricks B, inclosed in the metallic shell or casing B', provided with the upwardly-opening doors C C, the whole being supported by the vertical plates D D, stayed by braces D' D', as shown in Fig. 1.

The fire-bricks which form the end walls of the lower combustion or retort chamber, A, are constructed or arranged to form steps or shelves $a$, $a'$, and $a^2$, upon which rest the ends of the retort E, composed of a series of tubes, $b$, $b'$, $b^2$, $b^3$, $b^4$, and $b^5$, arranged relative to each other and connected together in the order named by the half turns or bends $c\,c$, as shown in Figs. 1 and 2.

Within each of the tubes $b$, $b'$, $b^2$, $b^3$, $b^4$, and $b^5$ is placed a cylinder, F, of wrought or cast iron or other suitable material, having its ends conical or pointed, and having set therein a series of radially-projecting pins or lugs, $d\,d$, extending to the inner periphery of the inclosing-pipe, said pins or lugs being made, preferably, diamond-shaped in cross-section, and so set in said cylinder as to present effective obstacles to a direct flow of the current of steam and oil through said tubes, thereby causing the steam and oil to be thoroughly mixed.

The tube $b$ is connected at one end with the exterior pipe, $e$, provided with the union-coupling $f$, for convenience in setting up the apparatus, said pipe $e$ connecting at $e'$ with the short vertical tube $g$, provided with a current-breaking cylinder, F', and connected in turn to the valve-casing G, to the opposite end of which is connected the steam-supply pipe $h$, provided with the steam-cock H, as shown.

The valve-casing G is provided with a side branch, in which is formed a valve-seat for the valve $i$, to be operated by the screw-stem $i'$ and the hand-wheel I; and to said branch is screwed one end of the spirally-coiled pipe $j$, inclosed in the steam-chamber J, as shown in Fig. 6, the other end of said pipe-coil leading to a pump or other means of forcing oil through said coil into the valve-chamber G, where it is joined by the jet of steam from the pipe $h$, and is forced thereby along the tube $g$, past the current-breaker F', along the pipe $e$, and successively through the tubes $b$, $b'$, $b^2$, $b^3$, $b^4$, and $b^5$, and thence through the pipe $k$ to the cooler K, from which the gas evolved is conveyed through the pipe $l$ to the holder, (not shown,) and from which it may be drawn for consumption. Steam is admitted to the chamber J through the pipe $s$ and discharged therefrom through the pipe $s'$. (See Fig. 6.)

L is a sediment-collector, provided with a glass gage, $m$, for determining the height of the sediment contained therein, and also with a cock, $n$, for drawing off said sediment when desired.

M M are the grate-bearing bars, supported upon the ledge $o$, formed in the side walls of the furnace; and $p\,p$ are the grates, made, preferably, of fire-brick and fitted to V-shaped grooves in the inner inclined sides of the bearers M M, as shown in Fig. 3.

N is an air-supply pipe leading from the pipe $k$ to a pump or blower, (not shown,) and provided with a valve, N', by which the flow of air into the pipe $k$ may be regulated so as to mix with the gas, as it escapes from the retort and before it enters the cooler, the proper amount of atmospheric air to produce the best result. Heating the oil before it comes in contact with the steam reduces the amount of steam necessary to mix therewith, and as a consequence reduces to a minimum the amount of carbonic-acid gas evolved. The passage of the combined oil and steam through the tube $g$ and past the current-breaking cylinder F', by breaking up the current and agitating the material, causes the oil and steam to be pretty well mixed before reaching the furnace.

The operation of my invention is as follows: Steam being admitted to the chamber J and to the pipe leading from the source of steam-supply to the valve H, and oil being admitted to the coil $j$, if the valves H and $i$ are opened, a jet of steam and a stream of oil meet in the valve-chamber G, and by the pressure of the steam the two fluids are carried through the pipe $g$ past the current-breaker or atomizer F', the pins $d$ of which serve to agitate the fluids and tend to break up the direct flow and mix the two fluids together, after which the partially-mixed fluids are forced along the pipe $e$ into the lower retort, $b$, thence to the several sections of retort-coil $b'$, $b^2$, $b^3$, $b^4$, and $b^5$, passing in each of said sections a current-breaking cylinder, the pins in which obstruct the direct flow of the current and cause a thorough mixing of said fluids by virtue of the agitation created by said obstructions at the same time that said retorts are subjected to the heat of the furnace, the result of which is that the mixed fluid becomes volatilized or changed to a gas, which flows through the pipe $k$ to its junction with the pipe N, where it is mixed with a suitable amount of atmospheric air, and is then discharged into the cooler K, and thence through the pipe $l$ to the holder, as described. The downdraft is produced by placing the fire-grate above the retort, closing the top of the furnace, and making the connection with the chimney beneath the retorts or at the bottom of the furnace, as shown.

What I claim as new, and desire to secure by Letters Patent of the United States, is—

1. In apparatus for manufacturing gas, a retort composed of an outer cylindrical shell, an inner cylinder having its ends closed and conical or rounded, and a series of radially-projecting pins or lugs set in or formed upon said inner cylinder and extending to the inner periphery of said outer shell.

2. In apparatus for manufacturing gaseous fuel or illuminating-gas, and for other like purposes, a retort composed of a series of parallel tubes connected together by half turns or bends, and a series of inner cylinders having closed conical or rounded ends and diameters less than the inner diameters of said tubes, located within said tubes, and each provided with a series of pins or lugs projecting radially therefrom and extending to the inner periphery of its inclosing tube or shell.

3. The combination of the furnace casing or shell, fitted with fire-brick lining provided with the steps $a$, $a'$, and $a^2$, so constructed and arranged that each step below the upper one projects into the furnace farther than the one above it, the fire-grate M $p$, the oil-inlet pipe $e$, the gas-outlet pipe $k$, and the multitubular retort E, all constructed and arranged substantially as described.

4. The combination, with a furnace and a retort exposed to the heat thereof, of a steam-supply pipe and an oil-supply pipe arranged to discharge their contents into the same chamber, a discharge-pipe leading from said chamber to the retort, and a current-breaking cylinder located in said pipe between said retort and chamber and provided with radially-projecting lugs or pins extending to the inner periphery of the inclosing cylindrical casing, as shown.

In testimony whereof I have signed my name to this specification, in the presence of two subscribing witnesses, on this 8th day of March, A. D. 1887.

EDWIN H. SHAW.

Witnesses:
N. C. LOMBARD,
WALTER E. LOMBARD.